United States Patent
Gupta et al.

(10) Patent No.: US 11,284,162 B1
(45) Date of Patent: Mar. 22, 2022

(54) CONSOLIDATION OF CHANNEL IDENTIFIERS IN ELECTRONIC PROGRAM GUIDE (EPG) DATA FOR ONE OR MORE EPG DATA PROVIDERS, AND USE OF CONSOLIDATED CHANNEL IDENTIFIERS FOR PROCESSING AUDIENCE MEASUREMENT DATA

(71) Applicant: Alphonso Inc., Mountain View, CA (US)

(72) Inventors: Manish Gupta, Bangalore (IN); Vijay Agarwal, Hoffman Estates, IL (US); Mehul Jain, Delhi (IN); Sushmita Singh, Ghaziabad (IN)

(73) Assignee: ALPHONSO INC., Mountain View, CA (US)

( * ) Notice: Subject to any disclaimer, the term of this patent is extended or adjusted under 35 U.S.C. 154(b) by 301 days.

(21) Appl. No.: 16/523,640

(22) Filed: Jul. 26, 2019

(51) Int. Cl.
H04N 21/482 (2011.01)
H04N 21/235 (2011.01)
H04N 21/258 (2011.01)
H04N 21/262 (2011.01)

(52) U.S. Cl.
CPC ....... H04N 21/4821 (2013.01); H04N 21/235 (2013.01); H04N 21/258 (2013.01); H04N 21/26283 (2013.01)

(58) Field of Classification Search
CPC ............. H04N 21/4821; H04N 21/258; H04N 21/235; H04N 21/26283
See application file for complete search history.

(56) References Cited

U.S. PATENT DOCUMENTS

| | | | | |
|---|---|---|---|---|
| 9,204,189 | B1* | 12/2015 | Oztaskent | H04N 21/2407 |
| 9,269,028 | B2 | 2/2016 | Kurzer et al. | |
| 2003/0056208 | A1* | 3/2003 | Kamada | H04H 60/31 725/9 |
| 2006/0010469 | A1* | 1/2006 | Reynolds | H04N 5/44543 725/39 |
| 2006/0253867 | A1* | 11/2006 | Potrebic | H04N 21/6582 725/50 |
| 2009/0260038 | A1* | 10/2009 | Acton | H04N 5/44543 725/49 |
| 2015/0373411 | A1* | 12/2015 | Jeong | H04N 21/4622 725/49 |
| 2019/0014365 | A1 | 1/2019 | Rowe et al. | |

OTHER PUBLICATIONS

"Metadata for Broadcast Television (Video Data Sources and Applications)" downloaded from webpage: http://what-when-how.com/video-search-engines/metadata-for-broadcast-television-video-data-sources-and-applications/, download date: Jul. 22, 2019, original posting date: unkown.
Channel Lineup for DirectTV, Effective Mar. 1, 2017, 1 page.
List of television stations in the United States by call signal (initial letter W), Wikipedia, printout date: Feb. 19, 2019, 6 pages.
Electronic Program Guide, User Guide for Cisco Digital media Manager 5.2.x, Chapter 26, pp. 26-1 to 26-8, document No. OL-15762-03, revised May 13, 2015, 8 pages.

* cited by examiner

*Primary Examiner* — Junior O Mendoza
(74) *Attorney, Agent, or Firm* — Panitch Schwarze Belisario & Nadel LLP

(57) ABSTRACT

Channel identifiers in electronic program guide (EPG) data are consolidated for one or more EPG providers, and the consolidated channel identifiers are used to automatically process audience measurement data.

22 Claims, 12 Drawing Sheets

| Consolidated Channel Identifier | 4:30p | 5:00p | 5:30p | 6:00p | 6:30p |
|---|---|---|---|---|---|
| CNN | Erin Burnett OutFront | Anderson Cooper 360 | | Cuomo Prime Time | |
| FX | Deepwater Horizon | | | | |
| ESPN | NBA Countdown | NBA: 76er at Pacers | | | |
| ESN | Highly Questionable | Around the Horn | Pardon the Interruption | Jalen & Jacoby | |
| BRAVO | Buying It Blind | | Get a Room with Carson and Thom | | Men in Black |
| NBC | First Look | American Ninja Warrior | | French Open | |

| Ch. Num. | Call Sign | 4:30p | 5:00p | 5:30p | 6:00p | 6:30p |
|---|---|---|---|---|---|---|
| 102 | CNN | Erin Burnett OutFront | Anderson Cooper 360 | | Cuomo Primetime | |
| 103 | FX | Deepwater Horizon | | | | |
| 200 | ESPN | NBA Countdown | NBA: 76ers at Pacers | | | |
| 201 | ESPNHD | NBA Countdown | NBA: 76ers at Pacers | | | |
| 202 | ESNWS | Highly Questionable | Around the Horn | Pardon the Interruption | Jalen & Jacoby | |
| 402 | CNNHD | Erin Burnett OutFront | Anderson Cooper 360 | | Cuomo Primetime | |

Figure 1: Sample EPG

CableCo X

| Ch. Num. | Call Sign | 4:30p | 5:00p | 5:30p | 6:00p | 6:30p |
|---|---|---|---|---|---|---|
| 102 | CNN | Erin Burnett OutFront | Anderson Cooper 360 | | Cuomo Primetime | |
| 103 | FX | Deepwater Horizon | | | | |
| 200 | ESPN | NBA Countdown | NBA: 76ers@Pacers | | | |
| 201 | ESPNHD | NBA Countdown | NBA: 76ers@Pacers | | | |
| 202 | ESN | Highly Questionable | Around the Horn | Pardon the Interruption | Jalen & Jacoby | |
| 402 | CNNHD | Erin Burnett OutFront | Anderson Cooper 360 | | Cuomo Primetime | |

CableCo Y

| Ch. Num. | Call Sign | 4:30p | 5:00p | 5:30p | 6:00p | 6:30p |
|---|---|---|---|---|---|---|
| 51 | CNN | Erin Burnett OutFront | Anderson Cooper 360 | | Cuomo Primetime | |
| 70 | ESPN | NBA Countdown | NBA: 76ers@Pacers | | | |
| 71 | ESPNHD | NBA Countdown | NBA: 76ers@Pacers | | | |
| 83 | ESN | Highly Questionable | Around the Horn | Pardon the Interruption | Jalen & Jacoby | |
| 90 | BRAVO | Buying It Blind | | | Get a Room with Carson & Thom | Men In Black |

Figure 2: Two cable companies with two different lineups for the same region

EPG A

| Ch. Num. | Call Sign | 4:30p | 5:00p | 5:30p | 6:00p | 6:30p |
|---|---|---|---|---|---|---|
| 102 | CNN | Erin Burnett OutFront | Anderson Cooper 360 | | Cuomo Primetime | |
| 103 | FX | Deepwater Horizon | | | | |
| 200 | ESPN | NBA Countdown | NBA: 76ers@Pacers | | | |
| 201 | ESPNHD | NBA Countdown | NBA: 76ers@Pacers | | | |
| 202 | ESNWS | Highly Questionable | Around the Horn | Pardon the Interruption | Jalen & Jacoby | |
| 401 | BRAVO | Buying It Blind | | Get a Room with Carson & Thom | | Men In Black |
| 402 | CNNHD | Erin Burnett OutFront | Anderson Cooper 360 | | Cuomo Primetime | |

EPG B

| Ch. Num. | Call Sign | 4:30p | 5:00p | 5:30p | 6:00p | 6:30p |
|---|---|---|---|---|---|---|
| 102 | CNN | Erin Burnett OutFront | Anderson Cooper 360 | | Cuomo Prime Time | |
| 103 | FX | Deepwater Horizon | | | | |
| 200 | ESPN | NBA Countdown | NBA: 76ers at Pacers | | | |
| 201 | ESPN HD | NBA Countdown | NBA: 76ers at Pacers | | | |
| 202 | ESN | Highly Questionable | Around the Horn | Pardon the Interruption | Jalen & Jacoby | |
| 401 | BRVO | Buying it Blind | | Get a Room with Carson & Thom | | Men In Black |
| 402 | CNN HD | Erin Burnett OutFront | Anderson Cooper 360 | | Cuomo Prime Time | |

Figure 3: EPG data from EPG providers A and B for the same TV provider and region

| Ch. Num. | Call Sign | 4:30p | 5:00p | 5:30p | 6:00p | 6:30p |
|---|---|---|---|---|---|---|
| 102, 402 | CNN | Erin Burnett OutFront | Anderson Cooper 360 | | Cuomo Primetime | |
| 103 | FX | Deepwater Horizon | | | | |
| 200, 201 | ESPN | NBA Countdown | NBA: 76ers at Pacers | | | |
| 202 | ESNWS | Highly Questionable | Around the Horn | Pardon the Interruption | Jalen & Jacoby | |

Figure 4: Intra EPG mapping of a given EPG provider's data for a given TV provider

| Ch. Num. | Call Sign | 4:30p | 5:00p | 5:30p | 6:00p | 6:30p |
|---|---|---|---|---|---|---|
| 51, 102, 402 | CNN | Erin Burnett OutFront | Anderson Cooper 360 | | Cuomo Primetime | |
| 103 | FX | Deepwater Horizon | | | | |
| 70, 71, 200, 201 | ESPN | NBA Countdown | NBA: 76ers@Pacers | | | |
| 83, 202 | ESNWS | Highly Questionable | Around the Horn | Pardon the Interruption | Jalen & Jacoby | |
| 90 | BRAVO | Buying It Blind | | | Get a Room with Carson & Thom | Men In Black |

Figure 5: Intra EPG mapping applied to different TV providers

| Ch. Num. | Call Sign | 4:30p | 5:00p | 5:30p | 6:00p | 6:30p |
|---|---|---|---|---|---|---|
| 51, 102, 402 | CNN | Erin Burnett OutFront | Anderson Cooper 360 | | Cuomo Primetime | |
| 103 | FX | Deepwater Horizon | | | | |
| 70, 71, 200, 201 | ESPN | NBA Countdown | NBA: 76ers @ Pacers | | | |
| 83, 202 | ESNWS | Highly Questionable | Around the Horn | Pardon the Interruption | Jalen & Jacoby | |
| 90 | BRAVO | Buying It Blind | | Get a Room with Carson & Thom | | Men In Black |

Intra EPG A

| Ch. Num. | Call Sign | 4:30p | 5:00p | 5:30p | 6:00p | 6:30p |
|---|---|---|---|---|---|---|
| 27, 102, 402 | CNN | Erin Burnett OutFront | Anderson Cooper 360 | | Cuomo Prime Time | |
| 103 | FX | Deepwater Horizon | | | | |
| 42, 43, 200, 201 | ESPN | NBA Countdown | NBA: 76er at Pacers | | | |
| 47, 202 | ESN | Highly Questionable | Around the Horn | Pardon the Interruption | Jalen & Jacoby | |
| 83 | BRVO | Buying It Blind | | Get a Room with Carson and Thom | | Men In Black |

Intra EPG B

Figure 6: Intra EPG mappings for two different EPG providers

| Consolidated Channel Identifier | 4:30p | 5:00p | 5:30p | 6:00p | 6:30p |
|---|---|---|---|---|---|
| CNN | Erin Burnett OutFront | Anderson Cooper 360 | | Cuomo Prime Time | |
| FX | Deepwater Horizon | | | | |
| ESPN | NBA Countdown | NBA: 76er at Pacers | | | |
| ESN | Highly Questionable | Around the Horn | | Pardon the Interruption | Jalen & Jacoby |
| BRAVO | Buying It Blind | | | Get a Room with Carson and Thom | Men in Black |
| NBC | First Look | American Ninja Warrior | | French Open | |

| EPG provider identification data (name and/or number) | Original channels | Consolidated channel identifier |
|---|---|---|
| CableCo X; 22289 | 51, 102, 402<br>103<br>70, 71, 200, 201 | CNN<br>FX<br>ESPN<br>⋮ |
| Cable Co Y; 33456 | 27, 102, 402<br>103<br>42, 43, 200, 201 | CNN<br>FX<br>ESPN<br>⋮ |
| ⋮ | ⋮ | ⋮ |

| EPG provider identification data (name and/or number) | Media network identifier or Media channel identifier | Consolidated channel identifier |
|---|---|---|
| CableCo X; 22289 | NBC or WRCB<br>ABC or WTVC<br>CNN<br>FX<br>ESPN<br>⋮ | NBC<br>ABC<br>CNN<br>FX<br>ESPN<br>⋮ |
| Cable Co Y; 33456 | PBS or WHYY<br>ABC or WPVI<br>CNN<br>FX<br>ESPN<br>⋮ | PBS<br>ABC<br>CNN<br>FX<br>ESPN<br>⋮ |
| ⋮ | ⋮ | ⋮ |

Figure 9

START

1200 – receive media guide data from one or more media guide data providers

1202 – compare program scheduling information across the multiple media channels of the one or more media guide providers for one or more time windows

1204 – identify one or more sets of similar media channels in the program scheduling information for the one or more time windows, the similarity based on similar program scheduling information and program metadata for the respective media channels

1206 – associate at least one set of similar media channels to a common consolidated channel identifier

1208 – receive one or more audience measurement records, each audience measurement record including at least an original media channel identifier and viewing time

1210 – use the association to associate one or more audience measurement records with a consolidated channel identifier

1212 – identify the program content associated with the audience measurement record by comparing the viewing time of the audience measurement record with the program scheduling information for the associated consolidated channel identifier

END

Figure 12

| Record | media network identifier/media channel identifier (call sign or network name) | Viewing time (time at which the measurement was made) or program start time | Designated market area (DMA) |
|---|---|---|---|
| | | | |
| 1000000 | WRCB or NBC | 3/1/2019 15:00 | Chattanooga |
| 1000001 | WTVC or ABC | 3/1/2019 19:00 | Chattanooga |
| ⋮ | ⋮ | ⋮ | ⋮ |

| Consolidated channel identifier | original media channel identifier (media network identifier, media channel identifier) |
|---|---|
| | |
| CNN | CNN, CNN HD, CNNHD, CNN/U.S., CNN Domestic, Cable News Network |
| FX | FX, FX HD, FXHD |
| ESPN | ESPN, ESPN HD, ESPNHD |
| ESN | ESN, ESN HD, ESNHD |
| BRAVO | BRAVO, BRAVO HD, BRAVOHD, BRVO, BRVO HD, BRVOHD |
| NBC | NBC, NBC HD, NBCHD |
| DIY | DIY, DIY HD, The DIY Channel, The DIY Ch. HD |
| ⋮ | ⋮ |

Figure 16

| Record | Original channel number | EPG provider identification data (name and/or number) | Viewing time (time at which the measurement was made) or program start time |
|---|---|---|---|
| | | | |
| 1000000 | 402 | 22289 | 3/1/2019 19:40 |
| 1000001 | 200 | 22289 | 3/1/2019 18:31 |
| ⋮ | ⋮ | ⋮ | ⋮ |

Figure 17

CONSOLIDATION OF CHANNEL IDENTIFIERS IN ELECTRONIC PROGRAM GUIDE (EPG) DATA FOR ONE OR MORE EPG DATA PROVIDERS, AND USE OF CONSOLIDATED CHANNEL IDENTIFIERS FOR PROCESSING AUDIENCE MEASUREMENT DATA

BACKGROUND OF THE INVENTION

Audience measurement is an important aspect of commercial television. It affects decisions around programming and advertising. Many measurements are generally tied to the viewing of available channels and TV programs. These can be delivered by a variety of methods, including over-the-air, cable, satellite and via the Internet.

The growing sophistication of delivery methods and viewing devices enables measurements on a viewer by viewer basis, and the ability to log what a viewer is watching at any particular point in time. Such logs can include time of day as well as identifying information about the channel (number or name) and the program being viewed. The logs may also include the delivery platform, such as a particular pay TV operator. Accurate audience measurement requires reconciling measurements across channels, programs, TV operators and geographic areas.

However, several factors complicate this reconciliation. The viewing device typically relies on electronic program guide (EPG) programming schedule data to supply much of this identifying information. When looking to measure the total audience for a given program, measurements from various delivery paths should be combined. FIG. 1 provides an example of identical programming being provided in both standard definition (SD) and high definition (HD) for ESPN®. However, the log data may record viewers of ESPN in SD as watching "ESPN," while those watching the HD version are recorded as watching "ESPNHD." These two identifiers are aliases for the same program channel. Audience measurement data from both of these channels should be mapped to ESPN.

Audience measurement data should also be mapped across TV operators where the same channel(s) are available. However, different TV providers (service providers) may assign different channel numbers to the same channel. For example, CableCo X may assign channel 200 to ESPN, whereas CableCo Y may assign ESPN to channel 70. And even in the same region, the package of channels available can differ from operator to operator. One operator may carry FX, while the other carries Bravo®. The second operator may also not carry CNN in HD. This is shown in FIG. 2.

Another factor complicating the mapping of different audience measurements is the use of more than one EPG data provider. The EPG data provider varies by operator and region. The different EPG providers can differ in their naming conventions for channels and programs. A network labeled "BRAVO" in one EPG might be labeled "BRVO" in another. One might put a space before "HD", while another does not have the space. A basketball game labeled "NBA: 76ers@Pacers" in one EPG might be labeled, "NBA: 76ers at Pacers" in another. An example illustrating these types of differences is shown in FIG. 3.

While these differences appear to be modest, they are sufficient to prevent a simple mapping approach such as literal matching. Manual resolution of these difference would be tedious and error prone for a single region involving tens or hundreds of channels. At a national scale, the same mapping could involve approximately 25,000 channel entries, making manual mapping highly impractical. What is needed is an automated method for mapping channels at a national scale across EPG providers. Audience measurement data can then be more easily processed by using the channel mapping.

SUMMARY OF THE PRESENT INVENTION

Channel identifiers in electronic program guide (EPG) data are consolidated for one or more EPG providers, and the consolidated channel identifiers are used to automatically process audience measurement data.

BRIEF DESCRIPTION OF THE DRAWINGS

Preferred embodiments of the present invention will now be described by way of example with reference to the accompanying drawings:

FIGS. 1-6 show EPG data for illustrating preferred embodiments of the present invention.

FIG. 7 shows consolidated EPG data in accordance with one preferred embodiment of the present invention.

FIGS. 8 and 9 are database tables for use in determining a consolidated channel identifier in accordance with one preferred embodiment of the present invention.

FIGS. 10-12 are flowcharts for implementing preferred embodiments of the present invention.

FIG. 15 shows one example of sample audience measurement records.

FIG. 16 shows a database table for associating an original media channel identifier with a consolidated channel identifier.

FIG. 17 shows another example of sample audience measurement records.

DETAILED DESCRIPTION OF THE INVENTION

Figure 10:
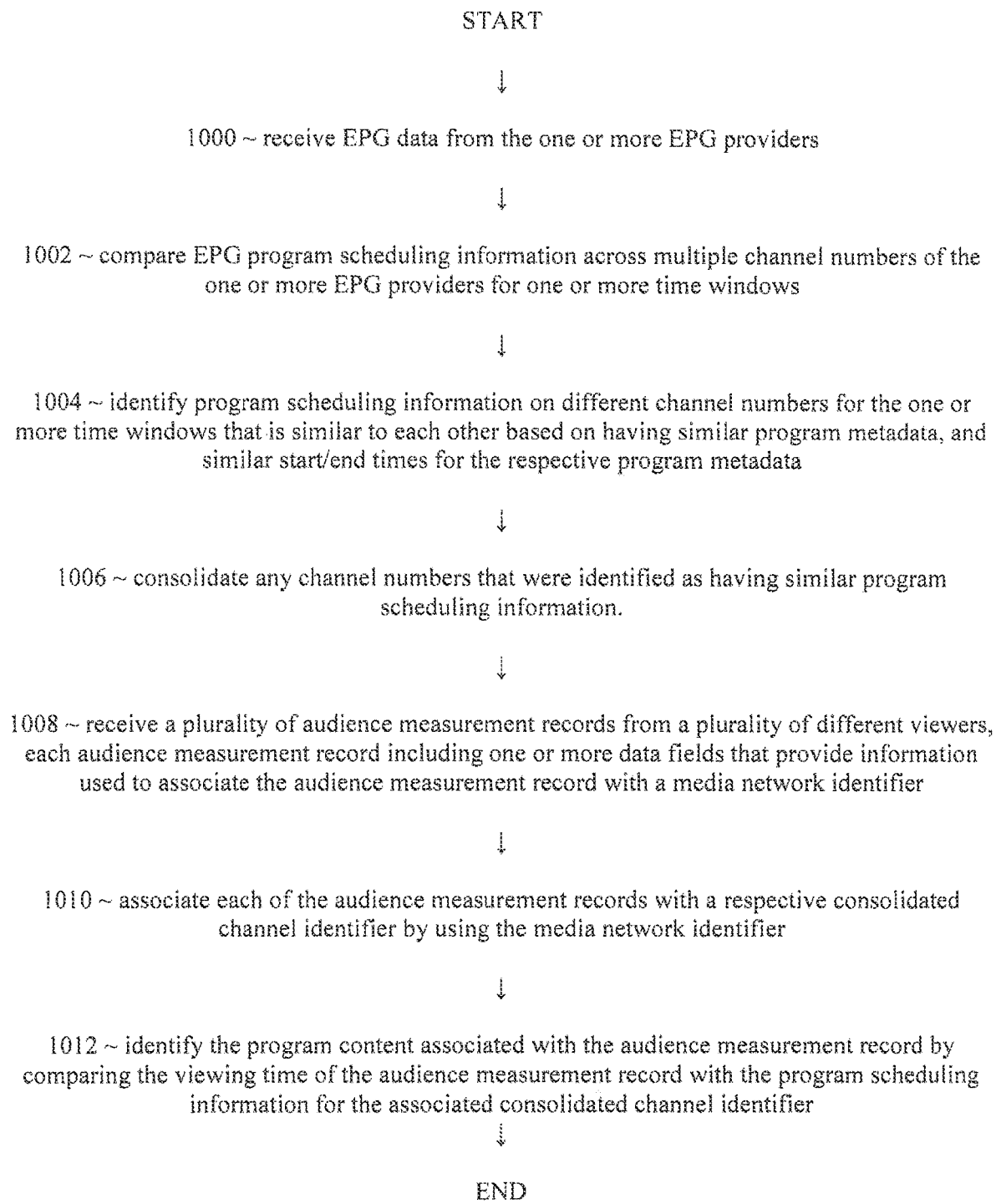

Certain terminology is used herein for convenience only and is not to be taken as a limitation on the present invention.

The words "a" and "an", as used in the claims and in the corresponding portions of the specification, mean "at least one."

I. Definitions

The following definitions are provided to promote understanding of the present invention.

electronic program guide (EPG)—An EPG is an application used with digital set-top boxes, newer television sets, and other devices (e.g., smartphones, game consoles) that presents scheduled television content to list current and scheduled programs on each channel, and often include a short summary and other metadata for each program. EPG is the electronic equivalent of a printed television program guide. EPG data—EPG data is the data contents of an EPG. EPG data typically includes (i) a channel lineup (e.g., channel numbers 2-999), (ii) television network name or abbreviation for each channel number in the channel lineup (e.g., NBC, ESPN, BRVO), and (iii) program scheduling information for each channel number in the channel lineup. EPG data is typically distributed in an XML representation.

Program scheduling information is also known in the art as "program schedule information" and "content schedule information."

media guide/media guide data—An EPG and EPG data are typically associated with video programs and video data. However, service providers can also provide audio-only programs (e.g., music, podcasts). For example, cable operators include many music channels in their lineups, some of which do not provide any video data. Thus, an EPG and EPG data may also be more generically referred to as a "media guide" and "media guide data," respectively, which encompasses program data that is audio-only, audio and video, or only video (video including audio and video). Media guide data likewise includes program scheduling information.

EPG data provider—An EPG data provider (also, referred to herein as "an EPG provider") is an entity that produces an EPG for a particular service provider (also, referred to herein as a "TV provider" or a "content provider"), such as a terrestrial or satellite cable operator, or a streaming media service provider. The channel lineup for different service providers may differ.

EPG provider identification data—"EPG provider identification data," as described herein, refers to any form of information that allows the EPG provider to be identified. It may be a name (e.g., CableCo X) or a number.

television network—A television network includes broadcast networks (e.g., NBC, ABC, PBS) and pay-TV networks (e.g., ESPN, DISNEY, HGTV, E!). The television network may be identified in an EPG by its "call sign." Call signs may be abbreviated by the EPG provider (e.g., BRAVO may be abbreviated as "BRVO"), or the call signs may be appended with additional information, such as a designator of high definition (e.g., ESPN may appear as "ESPNHD").

media network—A media network includes television networks, as well as audio-only media networks, such as broadcast and streaming radio stations.

media network identifier—A media network identifier, also referred to interchangeably as a "media channel identifier" or "an original media channel identifier," is any type of identifier that represents a specific media network. Typically, this will be the network's name or call sign (e.g., NBC, ABC, PBS, ESPN, DISNEY, HGTV, E!). The media network identifier may also be the call letters of a broadcast media network which is associated with, or affiliated with, a specific media network. For example, WRCB in Chattanooga, Tenn. is an NBC-affiliated television station, and WHYY in the Philadelphia, Pa. area is a PBS television and radio station.

channel numbers—Channel numbers are the numbers assigned to each television network in the channel lineup. Different service providers may have different channel lineups. For example, ESPN may appear on a different channel number for different service providers. The channel numbers may take the form of natural (simple) numbers (e.g., 1-1900 for Verizon FIOS channels), and decimal numbers used in digital subchannels typically available in over-the-air (OTA) channels (e.g., digital subchannels of channel 2 may be 2.1, 2.2, and so on). While not currently in conventional use, channel numbers may also be represented in a non-numerical form such as URLs, colors, letters, or symbols, each of which transforms to a set of numbers which are typically hidden from the user in the user interface. For example, a URL resolves to a numerical or alphanumerical IP address, so the channel number may simply be the numerical or alphanumerical IP address, but represented to the user as a URL. A similar scheme may be used for colors, letters, or symbols. In this manner, a channel number effectively acts as a channel locator.

consolidated (viewing) channel identifier—A "consolidated (viewing) channel identifier" is any alphanumerical identifier that represents the same television network (also, referred to herein as a "parent network") regardless of the service provider or definition designator. One representation of a consolidated channel identifier is the network name, such as NBC, ESPN, E!, or Disney. The media network identifier will typically match one of the network names. Thus, each media network identifier will match up with a respective consolidated channel identifier. For example, since WRCB in Chattanooga, Tenn. is an NBC-affiliated television station, its media network identifier (i.e., NBC) matches one of the consolidated channel identifiers (i.e., NBC).

A "consolidated channel identifier" as described herein is thus an identifier that represents the same media (television) network, regardless of the service provider delivering the channel or a definition designator such as SD or HD. A television network will typically have one set of program content and start/end times (adjusted for time zones) for the program content, regardless of the channel numbers used by a particular service provider for delivering the television network. Thus, service provider A might assign ESPN to channel 70, whereas service provider B might assign ESPN to channel 120. Likewise, if service provider A uses channel 200 as an HD version of ESPN, the consolidated channel identifier would still be ESPN for both channels 70 and 200. A set of consolidated channel identifiers thus provides unique identifiers, one for each media network. Thus, the DISNEY channel will have its own unique consolidated channel identifier (e.g., DISNEY), the E! network will have its own unique consolidated channel identifier (e.g., E!), and so on.

original channel number—an "original channel number" as described herein refers to the channel number used by the viewer's particular service provider. In the example above, channel 200 is the original channel number for the HD version of ESPN for service provider A, and channel 120 is the original channel number of ESPN for service provider B.

media channel—A media channel is the source for the media content. The media channel may be a TV channel, a radio station, or a media service. The media channel may be referred to by a number (e.g., Channel 4, Channel 650) that is mapped to a media content source, a network name (e.g., NBC, ESPN®) that is an abbreviation or branding name for the media content source, or a streaming source (e.g., Netflix, Hulu). The media channel may also be an "over-the-top" (OTT) media service, such as video-on-demand (VOD), Netflix, or Hulu. OTT provides on-demand streaming. The media channel may be a TV channel in which case it provides audio-visual media content, or it may be an audio-only channel in which case it provides audio-only media content. All media channels will be contained within the channel lineup of the media guide (EPG data).

metadata—Metadata, by definition, is data (information) that provides information about other data. The metadata described below is generally "descriptive metadata," which by definition, describes a resource for purposes such as discovery and identification. It can include elements such as title, abstract, author, and keywords. More specifically, the metadata described below is metadata related to specific TV content. Metadata are also referred to as "tags."

video program metadata—Video program metadata is the metadata of the program scheduled for a particular timeslot of the EPG. Examples of video program metadata include the program title, also, referred to herein as the "program name" (e.g., FRIENDS, Parks & Recreation, The View), season and episode in the case of a recurring TV program series, brief episode description in the case of a recurring TV program series, title or name of a movie if the scheduled program is a movie (the movie title or movie name is the equivalent data to the program title or program name), cast members (actors) of the program, proprietary identification numbers if available, and the like. As discussed below, video program metadata for the same exact program may differ among EPG providers, but will typically have significant similarity. Video program metadata may be very brief (e.g., only the name of the program), or it may be extensive. Many EPG's provide very brief metadata on an initial display screen that can be expanded to show more extensive metadata that is embedded into the EPG. A program typically includes audio and video, and thus is referred to herein as "video program metadata." However, a program may consist of only audio data, in which case the metadata may also be referred to as simply "program metadata." Thus, "program metadata" includes both video program metadata, and audio-only program metadata.

program scheduling information—Program scheduling information includes at least the data of the EPG that provides program metadata and start/end times for the respective program content in each of the timeslots of the EPG. (The start/end times also incorporate day/date information.) That is, the program scheduling information is the collective data that comprises (i) the program metadata, and (ii) the start/end times for the respective program content. The program metadata may also include other information such as parental ratings, program ID, series ID, and genre information.

predefined time window—A "predefined time window" as discussed herein is a span of time, such as 1 hour or 12 hours, or an even greater span of time. EPG's typically have time markers every half-hour for ease of viewing. A program that spans multiple timeslots will typically be shown in the EPG as a single block. A predefined time window could be as short as a half-hour, although an even shorter time window may be used. When performing the consolidation described below, one predefined time window may be used, or multiple predefined time windows may be used. For example, one relatively long time window may be used (e.g., 12 hours, seven days), or multiple relatively short time window may be used (e.g., three one-half hour time windows, such as 10:00 am-10:30 am, 4:00 pm-4:30 pm, 10:00 pm-10:30 pm).

audience measurement data/audience measurement record—Audience measurement data, as described herein, refers to one or more audience measurement records. Each audience measurement record includes at least an original channel number, viewing time of program contents that was viewed, and some type of EPG provider identification data. This set of information allows for a determination to be made regarding what program content was being tuned to, and thus presumably viewed. Entire businesses such as Nielsen Media Research which produces Nielsen® Ratings are devoted to collecting this type of data. Audience measurement data is also referred to herein as "audience measurement information."

viewing time—"Viewing time," as used herein, refers to the time when program content is experienced. In the case of video content, the viewing time refers to the time when the program content was presumably heard or seen. In the case of audio-only content, the viewing time refers to the time when the program content was heard.

generic program ID—Unique ID for a program or entertainment asset (e.g., show, movie, sports). It is used to relate the program to TV schedules and movie showtimes. It is specific to a program's title, description language, and version. One example of a generic program ID is a "tmsID" which is used by Gracenote®, and is a 14-character alphanumeric field. Another example of a generic program ID is a "Programid" used by Rovi®, which is a 32 bit integer.

II. Detailed Description

In one preferred embodiment, the mapping process starts by identifying aliased channels within the data from a given EPG provider, that is "intra-EPG mapping." Two channel call signs (television networks) are considered equivalent if they carry the same program schedule over a target match period, such as seven days. An advantage of applying intra-EPG mapping as a first step is a significant reduction in data. It is typical for an initial EPG data set to contain 25,000 channels. Intra-EPG mapping can reduce this to 5,000 channels or less. This significantly reduces the work required in subsequent channel mapping steps.

The channel matching process is performed using the program scheduling information, including any available program metadata, such as program name (program title), program ID, and airing time. All of this information should match exactly for a given EPG data provider. However, some small tolerance (such as slight misspellings) can be included if there are known issues with the typographical errors from a specific provider.

An example of intra-EPG mapping is shown in FIG. 4 wherein intra-EPG mapping is applied to the EPG example of FIG. 1 for a given EPG provider and TV provider. The initial EPG "before" is mapped by comparing program schedules and information to recognize that CNN and CNNHD carry the same programming, as do ESPN and ESPNHD. In this simple example, the initial six rows of program scheduling information become four rows of program scheduling information, thereby resulting in the deletion of two rows of program scheduling information.

Similarly, the EPG data across two different TV providers, whose channel numbers often differ, can be mapped. An example of this is shown in FIG. 5 wherein intra-EPG mapping is applied to the EPG example in FIG. 2. For ease of illustration, the Channel number column in FIG. 5 shows only the consolidated channel identifiers (e.g., 51, 102, 402 for CNN; 70, 71, 200, 201 for E!). However, the actual stored data may include TV provider identification data associated with each channel number (e.g., 51 (CableCo Y); 102 (CableCo X); 402 (CableCo X)).

The two variations of intra-EPG mappings in FIGS. 4 and 5 are illustrated for clarity. They could be combined into a single process, if desired.

Once the data from each EPG provider has been reduced, they can be combined through "inter-EPG mapping." As previously illustrated in FIG. 3, different EPG providers may use somewhat different channel names for the same channel, and somewhat different program names for the same program. Consequently, there may not be an exact match for either when comparing channel and program data from two different providers.

In the case where the EPG data from two different sources covers the same service provider (e.g. the same local cable network), the channel numbers between the two EPGs should match, and this fact can be used to efficiently create a candidate set of consolidated mappings without doing an exhaustive cross matching of channels from the intra-EPG results for each EPG provider. One can first search for entries sharing a common channel number.

Nevertheless, the hypothesis that a set of channels with the same channel number are in fact the same channel is tested by using a similarity test based on the proximity of the two entries to confirm they, in fact, refer to the same channel.

That proximity can be calculated using a suitable distance measure for each of the individual components of the program entry, such as the call sign and one of the program names (e.g., the currently airing program name), and then combining these to create the final proximity measure. An example of a suitable distance measure is the Levenshtein distance between two strings. If the proximity measure indicates a match within an acceptable tolerance, the hypothesis that the two channels are the same is confirmed, and they are consolidated. An example of intra-EPG mappings from two different EPG providers is shown in FIG. 6. Differences between the two are visible in call signs (e.g. "BRAVO" vs "BRVO") and program names (e.g. "76ers@Pacers" vs "76ers at Pacers"). Using proximity matching, mappings between the two EPG providers can be efficiently constructed and tested. That is, "BRAVO" and "BRVO are deemed to have "similar call signs." "76ers@Pacers" and "76ers at Pacers" are deemed to have "similar program names." In a large percentage of the cases, the call signs and program names will be identical, and thus no similarity algorithm, such as the Levenshtein distance, would need to be performed to make the determination that the channels should be consolidated.

Channels that do not match may be subjected to an additional matching process to identify additional pairings. This process uses a full search of unmatched channels from intra-EPG A with those in intra-EPG B. For a given unpaired channel, its closest proximity match is compared to a threshold to decide if the match is acceptable. If yes, the channels are consolidated.

For example, the channel labeled "BRAVO" in EPG A shares no common channel numbers with the channel labeled "BRVO" in EPG B. However, they are clearly closely related in their programming. This would be even more evident looking at a larger sample of the schedule.

This method can also be applied to multiple regions, cable TV providers and EPG providers.

FIG. 7 shows a portion of a program lineup for a particular date listed by consolidated channel identifiers. FIG. 7 is similar to FIG. 6, except that in FIG. 7, the consolidated channel identifier is the sole identifier for a particular network. The program lineup of FIG. 7 is used to process audience measurement records, as described in more detail below.

FIG. 8 is database table 800 that maps EPG providers, consolidated channel identifiers, and original channel numbers. The table 800 may be used for mapping audience measurement records with the appropriate consolidated channel identifiers of FIG. 7, particularly if an audience measurement record does not include any media network identifier, but includes EPG provider identification data, which may be in the form of a name (e.g., CableCo X) or a number. The EPG consolidation process described above provides sufficient information to build the table 800. In FIG. 8, the channels in the second column show the channels that are equivalent to the corresponding consolidated channel identifier.

FIG. 9 is a database table 900 that maps EPG providers, media network identifiers or media channel identifiers, and consolidated channel identifiers. The table 900 may also be used for mapping audience measurement records with the appropriate consolidated channel identifiers of FIG. 7, particularly if an audience measurement record includes EPG provider identification data, and a media network identifier or media channel identifier.

FIG. 10 shows a flowchart in accordance with one preferred embodiment of the present invention which provides an automated method of consolidating channel numbers in electronic program guide (EPG) data for one or more EPG providers, and using the consolidated channel identifiers to reconcile audience measurement data across different channel numbers which provide the same program content. In one preferred embodiment, the method operates as follows:

STEP 1000: Receive EPG data from the one or more EPG providers.

STEP 1002: Compare EPG program scheduling information across multiple channel numbers of the one or more EPG providers for one or more time windows.

STEP 1004: Identify program scheduling information on different channel numbers for the one or more time windows that is similar to each other based on having similar program metadata, and similar start/end times for the respective program metadata.

STEP 1006: Consolidate any channel numbers that were identified as having similar program scheduling information. Channels that have similar program scheduling information are also referred to herein as being "similar media channels."

STEP 1008: Receive a plurality of audience measurement records from a plurality of different viewers, each audience measurement record including one or more data fields that provide information used to associate the audience measurement record with a media network identifier.

STEP 1010: Associate each of the audience measurement records with a respective consolidated channel identifier by using the media network identifier.

STEP 1012: Identify the program content associated with the audience measurement record by comparing the viewing time of the audience measurement record with the program scheduling information for the associated consolidated channel identifier.

Figure 11:
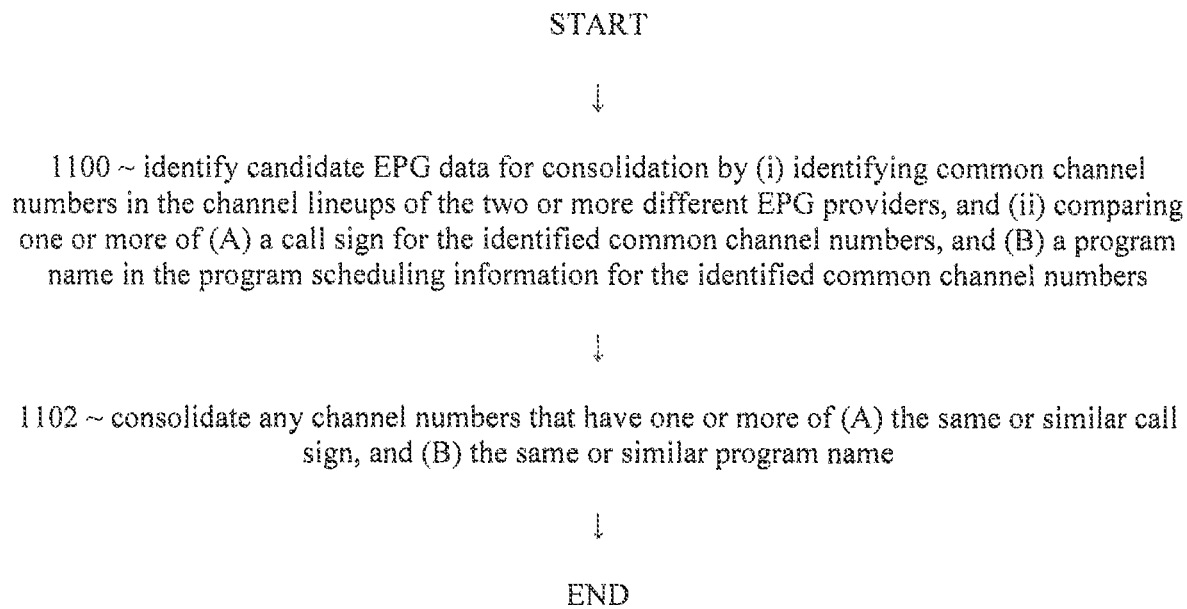

FIG. 11 shows a flowchart of optional steps that may occur prior to STEP 1002 above when the EPG data includes EPG data from two or more different EPG providers for the same service provider.

STEP 1100: Identify candidate EPG data for consolidation by (i) identifying common channel numbers in the channel lineups of the two or more different EPG providers, and (ii) comparing one or more of (A) a call sign for the identified common channel numbers, and (B) a program name in the program scheduling information for the identified common channel numbers.

STEP 1102: Consolidate any channel numbers that have one or more of (A) the same or similar call sign, and (B) the same or similar program name.

After completion of these steps, the consolidated channel identifiers for the two or more different EPG providers for the same service provider are not further compared against each other with respect to their EPG program scheduling information. Thus, steps 1002-1006 in FIG. 10 are not performed. However, these steps are performed for EPG data used by different service providers.

FIG. 12 is a flowchart in accordance with another preferred embodiment of the present invention which provides an automated method for reconciling audience measurement information across similar media channels delivered by one or more content providers using media guide data for one or more media guide data providers. In one preferred embodiment, the method operates as follows:

STEP 1200: Receive media guide data from one or more media guide data providers.

STEP 1202: Compare program scheduling information across the multiple media channels of the one or more media guide providers for one or more time windows.

STEP 1204: Identify one or more sets of similar media channels in the program scheduling information for the one or more time windows, the similarity based on similar program scheduling information and program metadata for the respective media channels.

STEP 1206: Associate at least one set of similar media channels to a common consolidated channel identifier.

STEP 1208: Receive one or more audience measurement records, each audience measurement record including at least an original media channel identifier and viewing time.

STEP 1210: Use the association to associate one or more audience measurement records with a consolidated channel identifier.

STEP 1212: Identify the program content associated with the audience measurement record by comparing the viewing time of the audience measurement record with the program scheduling information for the associated consolidated channel identifier.

Figure 13:
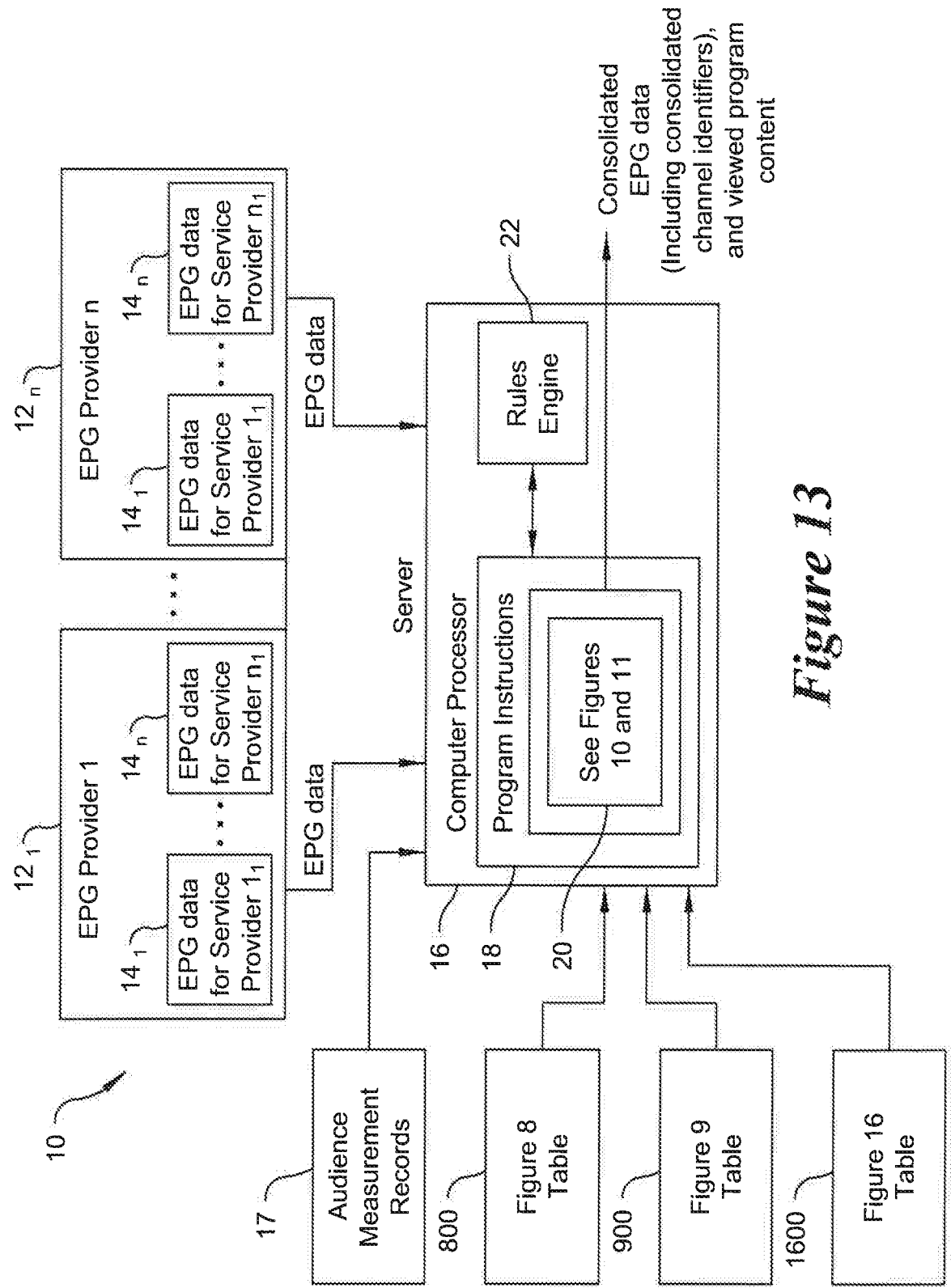
FIGS. 13 and 14 are schematic diagrams of systems for implementing preferred embodiments of the present invention.

FIG. 13 shows a system 10 for implementing preferred embodiments of the present invention shown in FIGS. 10 and 11. A plurality of EPG providers 12₁-12ₙ provide EPG data to server 16. Each EPG provider may prepare EPG data for one or more service providers, labeled as EPG data 14₁-14ₙ. The server 16 also receives audience measurement records 17, database table 800, and database table 900. The server 16 includes a computer processor 18 that executes program instructions 20 to perform the steps shown in FIGS. 10 and 12, and optionally, in FIG. 11, to perform the above-described EPG data consolidation. Rules engine 22 (discussed above) assists with the data consolidation process. The output of the computer processor 18 includes the consolidated EPG data (including the consolidated channel identifiers), and the viewed program content derived from audience measurement records and the consolidated EPG data.

Figure 14:
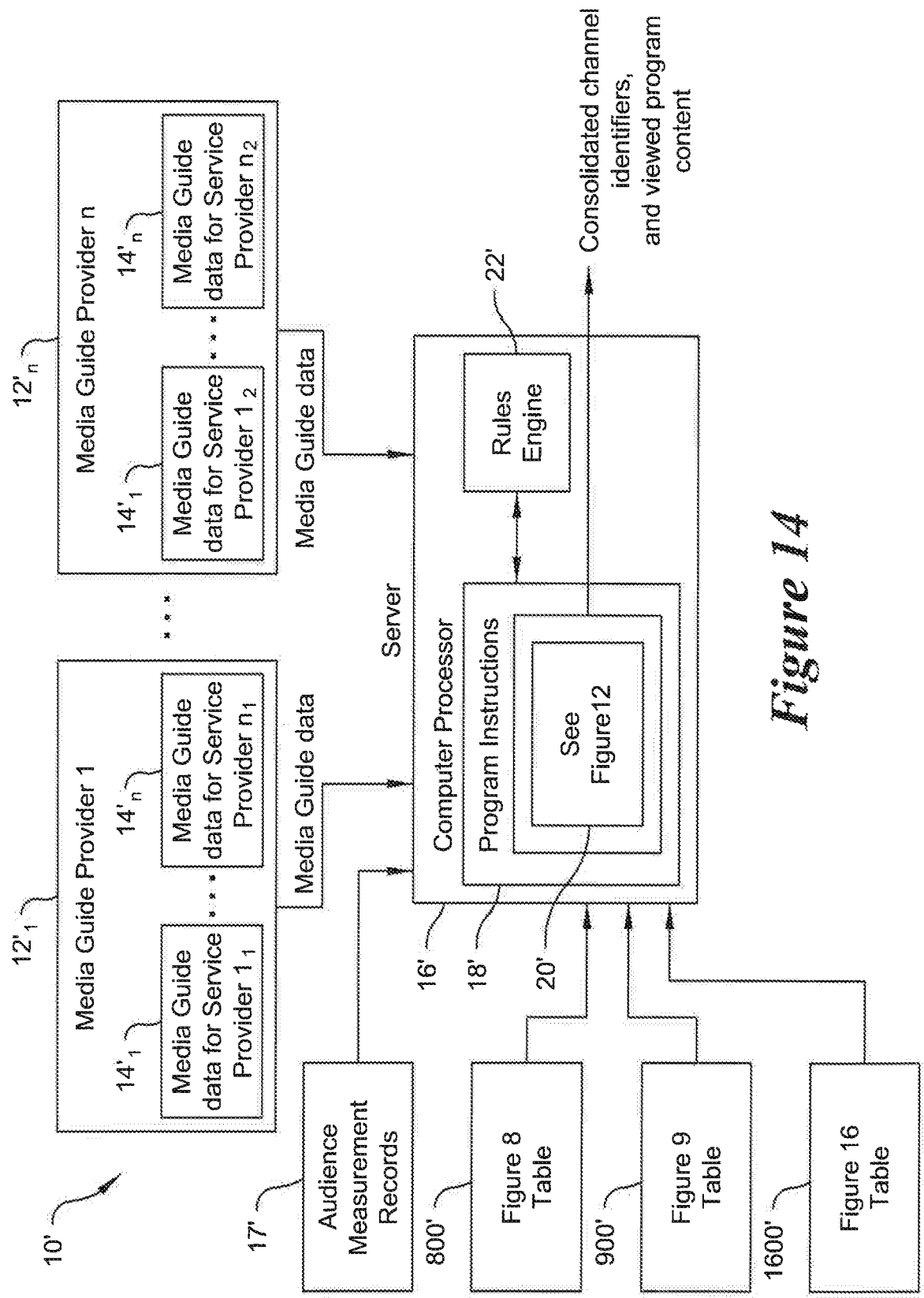

FIG. 14 shows a system 10' for implementing preferred embodiments of the present invention shown in FIG. 12. A plurality of media guide providers 12₁'-12ₙ' provide media guide data to server 16'. Each media guide provider may prepare media guide data for one or more service providers, labeled as media guide data 14₁'-14ₙ'. The server 16' also receives audience measurement records 17', database table 800', and database table 900'. The server 16' includes a computer processor 18' that executes program instructions 20' to perform the steps shown in FIG. 12, to perform the above-described media guide data consolidation. Rules engine 22' (discussed above) assists with the data consolidation process. The output of the computer processor 18' includes the consolidated channel identifiers, and the viewed program content derived from audience measurement records and the consolidated channel identifiers.

III. Additional Considerations

A. Character/Text String Similarity

For determining the similarity of program schedules, any conventional character string/text string similarity algorithm may be used that calculates metrics of similarity. Strings with similarity metrics above a predetermined threshold are then deemed to be similar. One suitable algorithm is described in U.S. Pat. No. 9,269,028 (Kurzer et al.). EPG data is typically distributed in an XML representation, thereby allowing the data to be easily compared using any such conventional character string/text string similarity algorithm.

As discussed above, many EPG's provide very brief metadata on an initial display screen that can be expanded to show more extensive metadata that is embedded into the EPG. As shown in FIGS. 1-6, the brief metadata typically includes the program name. In one preferred embodiment, only the program name portion of the metadata is used by the string similarity algorithm. If the program name is not readily identifiable by a field designator, or cannot be readily determined by any other techniques, it may be necessary to parse the metadata for the timeslots by an artificial intelligence algorithm or the like to extract the portion of the metadata that likely represents the program name. This process may produce incorrect or poor results for some timeslots. However, it should generally produce accurate results over a large number of timeslots, so that the string similarity algorithm should be able to accurately identify channel numbers that have similar program scheduling information.

B. Selection of Consolidated Channel Data

When two channel numbers are found to be similar, a determination must be made regarding which set of data to use in the consolidated set of data. In one preferred embodiment, a rules engine makes this determination. Examples of rules that may be programmed into the rules engine are as follows, described in text (not programming) form:

i. Always use non-abbreviated version of a call sign in the consolidated set of data if one call sign is an abbreviated version of the other.

ii. Always delete "HD" and "UHD" from call sign.

iii. Always use non-abbreviated version of a program name in the consolidated set of data if one program name is an abbreviated version of the other.

iv. Include all available metadata for a timeslot in the consolidated set of data.

Other types of rules may also operate to simplify the consolidation process, such as a rule to always use the set of data from a particular EPG provider or from a particular service provider.

The consolidation described above presumes that after the consolidation, channel numbers that were identified as having similar program scheduling information are associated with only one set of program scheduling information for the media channel associated with the respective channel numbers. In this manner, the consolidation reduces the total size of the EPG data for the one or more EPG providers because there is no duplication of program scheduling information. This consolidation simplifies the process for identifying the program content associated with the audience measurement record because the viewing time of the audience measurement record is compared with only one set of program scheduling information for the associated consolidated channel identifier.

C. Variable Time Window

Instead of using one or more predefined time windows to determine if the program scheduling information is similar for multiple (different) channels, a variable time window may be used. For example, if a sufficiently strong match occurs after comparing a relatively brief time window (e.g., 12 hours), then the comparison process can be stopped. However, if there is not a sufficiently strong match, the time window may be expanded and then compared again to determine the strength of the match compared to the desired threshold.

D. Audience Measurement Record Format

Audience measurement records may be received by the server 16 in many different formats depending upon what entity is providing them, and whether or not their data fields have undergone any pre-processing or normalization. For example, a device identifier (i.e., the device that has played the media content) or a consolidated channel identifier may be derived from a raw viewing record.

FIG. 15 shows one example of the fields of an audience measurement record format which includes at least the following fields:
1. Record number
2. media network identifier/media channel identifier (call sign or network name)
3. viewing time (time at which the measurement was made) or program start time
4. designated market area (DMA)

Other fields may be included such as a household ID, an IP address associated with the media device that plays the program, a zip code, generic program ID (e.g., Rovi's Programid or Gracenote's tmsID), and metadata associated with the media program (e.g., title, genre). If the third field records the program start time instead of the viewing time (time at which the measurement was made), this value is determined by using the viewing time and then identifying the start time of the viewed program based on EPG data. In the example of FIG. 15, the third field records the program start time.

Using the data fields of FIG. 15, particularly the media network identifier/media channel identifier, and the database table 900 of FIG. 9, each record number may be associated with a consolidated channel identifier. For example, since record number 1000000 includes call sign WRCB as the media network identifier, then this record number will be associated with NBC. If the record number includes the network name (here, NBC) as the media network identifier, then there will be a one-to-one association of the network name to the consolidated channel identifier of NBC, and this record number will also be associated with NBC.

The consolidated channel identifier in FIG. 7 is only a single alphanumeric character string. However, as discussed above, the consolidated channel identifier may have many different permutations, depending upon the naming convention selected by a particular EPG provider (e.g., BRAVO, BRVO, BRAVO HD). Accordingly, it is necessary to provide a mapping between the single consolidated channel identifier and any known permutations thereof that may appear in an audience measurement record. FIG. 16 shows a portion of a database table 1600 suitable for such a purpose.

The naming convention can sometimes be even more complicated because there can be different feeds which come from the same content provider that have different programming. Consider a hypothetical network called "The Sports Place" which has an east and west feed. In some cases, they are carrying the same program simultaneously. In other cases, their programming may differ. This may be treated as two parent networks, as follows:

Parent Network: "Sports Place East"
"Sports Place HD" CableCo A, Guide X2, region info (with the region in the east)
"The Sports Place" CableCo B, Guide X1, region info (with the region in the east)
"Sports Place" SatCo P, Guide Y1, region info (with the region in the east)

Parent Network: "Sports Place West"
"Sports Place West" SatCo Q, Guide Y2, region info (national)
"Sports Place HD" CableCo B, Guide X2, region info (with the region in the west)

The two entries named "Sports Place HD" actually refer to two different feeds from "The Sports Place"—one east and one west. These are resolved by looking at the programming lineup, channel numbers, and the like, as described herein.

Once the consolidated channel identifier is known, the viewing time and the program lineup of FIG. 7 (which is presumed in this example to be for the date of Mar. 1, 2019) may be used to identify the program content that was viewed. For example, if the viewing time is 17:15 (5:15 pm) or the program start time is 17:00 (5:00 pm), the program content that was viewed is recorded as "American Ninja Warrior." If metadata is available, such as the program title, or if a generic program ID field is provided which can be used to obtain the program title, this program title can be checked against the program title obtained from the consolidated program listing to verify the accuracy of the process. If the titles do not match, the rules engine 22 may be programmed to ignore this particular record number, and thereby not count this result in the audience measurement data. However, it is not necessary to perform any program title checking, and the system 10 can be programmed to presume that the program title identified in the consolidated program listing is the correct program content to record as being viewed.

FIG. 17 shows another example of the fields of an audience measurement record format which includes at least the following fields:
1. Record number
2. original channel number
3. EPG provider identification data (name and/or number)
4. viewing time (time at which the measurement was made) or program start time In this example, the EPG provider identification data is recorded as a number, and the fourth field records the viewing time, not the program start time as in FIG. 15.

Using the data fields of FIG. 17, and the database table 800 of FIG. 9, each record number may be associated with a consolidated channel identifier. For example, since the original channel number of record number 100000 is 402, and the EPG provider identification number is 22289, the database table 800 shows that this record number should be associated with the consolidated channel identifier of CNN. Likewise, the consolidated channel identifier for record number 100001 is ESPN.

Once the consolidated channel identifier is known, the viewing time and the program lineup of FIG. 7 may be used to identify the program content that was viewed. For example, the viewing time of record number 100000 is 19:40 (5:40 pm). Accordingly, the program content that was viewed is recorded as "Anderson Cooper 360." Likewise, the program content for record number 100001 is recorded as "NBA: 76er at Pacers."

Other audience measurement record formats are within the scope of the present invention, as long as they provide sufficient information to obtain the consolidated channel identifier and viewing time, which, in turn, are used to identify the viewed program. In one alternative embodiment, fields may provide start and stop times for each viewed program. For example, the audience measurement record may generate a new record number each time that a viewer turns or turns off a media device, or changes the channel of a media device. By knowing the duration of the viewing session, the audience measurement records may also be used to identify commercials that were played during the viewing session, thereby recording potential exposure to such commercials. An additional database (not shown) that maintains a record of all commercials played during a program may be used for this purpose.

Audience measurement records are typically generated via automatic reporting devices and techniques that monitor media device activity. These devices and techniques are well-known in the art and thus are not described in further detail herein. Some devices are dedicated measurement devices, such as the Nielsen box. Some techniques capture media device activity directly from a set-top box, or from a monitoring device which is in proximity to the media device and which uses automatic content recognition (ACR) and digital signature/fingerprint comparisons to identify media content being played by the media device.

The present invention may be implemented with any combination of hardware and software. If implemented as a computer-implemented apparatus, the present invention is implemented using means for performing all of the steps and functions described above.

When implemented in software, the software code for the computer processors 18 and 18', namely, the program instructions 20 and 20', can be executed on any suitable processor or collection of processors, whether provided in a single computer or distributed among multiple computers.

The present invention can also be included in an article of manufacture (e.g., one or more non-transitory, tangible computer program products) having, for instance, computer readable storage media. The storage media has computer readable program code (program instructions 20 and 20') stored therein that is encoded with instructions for execution by a processor (computer processor 18 and 18') for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above. The storage media may also be implemented via network storage architecture, wherein many devices, which are paired together, are available to a network.

The computer(s) used herein for the server 16 and 16' may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The computer processors 18 and 18' are not a general-purpose computers, but instead are specialized computer machine that perform a myriad of functions (e.g., character/text string comparison, data consolidation) that are not native to a general-purpose computer, absent the addition of specialized programming.

The server 16 and 16' and the EPG providers 12 and media guide providers 12' may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A computer program product for automatically consolidating channel numbers in electronic program guide (EPG) data for one or more EPG providers into a set of consolidated channel identifiers, and using the set of consolidated channel identifiers to automatically process audience measurement data, each channel number being associated with a media channel, the EPG data for each EPG provider including a channel lineup and program scheduling information for each channel number, the computer program product comprising a computer readable medium tangibly embodying non-transitory computer-executable program instructions thereon that, when executed, causes a computing device to:
- (a) consolidate channel numbers in EPG data for one or more EPG providers by:
  - (i) receiving EPG data from the one or more EPG providers,
  - (ii) comparing EPG program scheduling information across multiple channel numbers of the one or more EPG providers for multiple, non-adjacent time windows,
  - (iii) identifying program scheduling information on different channel numbers for the multiple, non-adjacent time windows that is similar to each other based on having similar (A) program metadata, and (B) start/end times for the respective program metadata, and
  - (iv) consolidating any channel numbers that were identified as having similar program scheduling information, thereby creating consolidated channel identifiers for each of the channel numbers of the one or more EPG providers;
- (b) receive a plurality of audience measurement records from a plurality of different viewers, each audience measurement record including one or more data fields that provide information used to associate the audience measurement record with a media network identifier; and
- (c) associate each of the audience measurement records with a respective consolidated channel identifier by using the media network identifier.

2. The computer program product of claim 1 wherein each audience measurement record further includes viewing time, and wherein the computer-executable program instructions, when executed, further cause the computing device to:
- (d) identify the program content associated with the audience measurement record by comparing the viewing time of the audience measurement record with the program scheduling information for the associated consolidated channel identifier.

3. The computer program product of claim 1 wherein the EPG data includes EPG data from two or more different EPG providers for the same service provider, and wherein for the EPG data from the two or more different EPG providers for the same service provider, the computer-executable program instructions, when executed, further cause the computing device to:
- (e) identify candidate EPG data for consolidation by:
  - (i) identifying common channel numbers in the channel lineups of the two or more different EPG providers, and
  - (ii) comparing one or more of (A) a call sign for the identified common channel numbers, and (B) a program name in the program scheduling information for the identified common channel numbers; and
- (f) consolidating any channel numbers that have one or more of (A) the same or similar call sign, and (B) the same or similar program name,
  - wherein the set of consolidated channel identifiers for the two or more different EPG providers for the same service provider are not further compared against each other with respect to their EPG program scheduling information.

4. The computer program product of claim 1 wherein the EPG data is for a single EPG provider.

5. The computer program product of claim 1 wherein the EPG data is from two or more different EPG providers.

6. The computer program product of claim 1 wherein the EPG data is for two or more different service providers.

7. The computer program product of claim 1 wherein the program metadata includes a program description.

8. The computer program product of claim 1 wherein the data processor is configured to compare EPG program scheduling information across all of the channel numbers of the one or more EPG providers for the multiple, non-adjacent time windows.

9. The computer program product of claim 1 wherein the multiple, non-adjacent time windows are predefined time windows.

10. The computer program product of claim 1 wherein one or more of the media channels are television channels.

11. The computer program product of claim 1 wherein the one or more data fields of each audience measure record includes (i) a channel number, and (ii) EPG provider identification data.

12. The computer program product of claim 1 wherein the one or more audience measurement records are generated via automatic reporting devices that monitor media device activity.

13. The computer program product of claim 1 wherein the multiple, non-adjacent time windows are collectively a time window that spans a half-day or multiple days.

14. A computer program product for automatically reconciling audience measurement information across similar media channels delivered by one or more content providers using media guide data for one or more media guide data providers, the computer program product comprising a computer readable medium tangibly embodying non-transitory computer-executable program instructions thereon that, when executed, causes a computing device to:
- (a) receive media guide data from the one or more media guide data providers, said media guide data including program scheduling information, and one or more original channel identifiers and metadata for each of the media channels;
- (b) compare program scheduling information across the multiple media channels of the one or more media guide providers for multiple, non-adjacent time windows;
- (c) identify one or more sets of similar media channels in the program scheduling information for the multiple, non-adjacent time windows, the similarity based on similar program scheduling information and program metadata for the respective media channels;
- (d) associate at least one set of media channels that are determined to be similar in step (c) based on similar program scheduling information and program metadata to a common consolidated channel identifier;
- (e) receive one or more audience measurement records, each audience measurement record including at least an original media channel identifier; and
- (f) using the association to associate one or more audience measurement records with a consolidated channel identifier.

15. The computer program product of claim 14 wherein each audience measurement record further includes viewing time data, and wherein the computer-executable program instructions, when executed, further cause the computing device to: (g) identify the program content associated with the audience measurement record by comparing the viewing time of the audience measurement record with the program scheduling information for the associated consolidated channel identifier.

16. The computer program product of claim 14 wherein the media channel similarity is determined using at least a character string/text string similarity algorithm.

17. The computer program product of claim 14 wherein the original channel identifier is a channel call sign or channel number.

18. The computer program product of claim 14 wherein the media guide data is electronic program guide (EPG) data, and the media guide data providers are EPG data providers.

19. The computer program product of claim 14 wherein the multiple, non-adjacent time windows are predefined time windows.

20. The computer program product of claim 14 wherein one or more of the media channels are television channels.

21. The computer program product of claim 14 wherein the one or more audience measurement records are generated via automatic reporting devices that monitor media device activity.

22. The computer program product of claim 14 wherein the multiple, non-adjacent time windows are collectively a time window that spans a half-day or multiple days.

* * * * *